April 7, 1964      A. D. HERTZOG      3,127,984
LUNCH KIT
Filed June 7, 1961
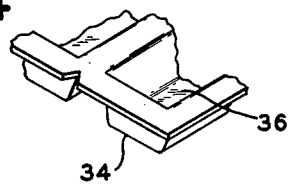
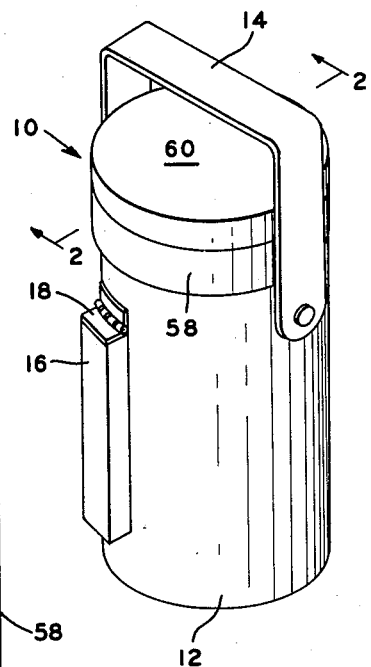
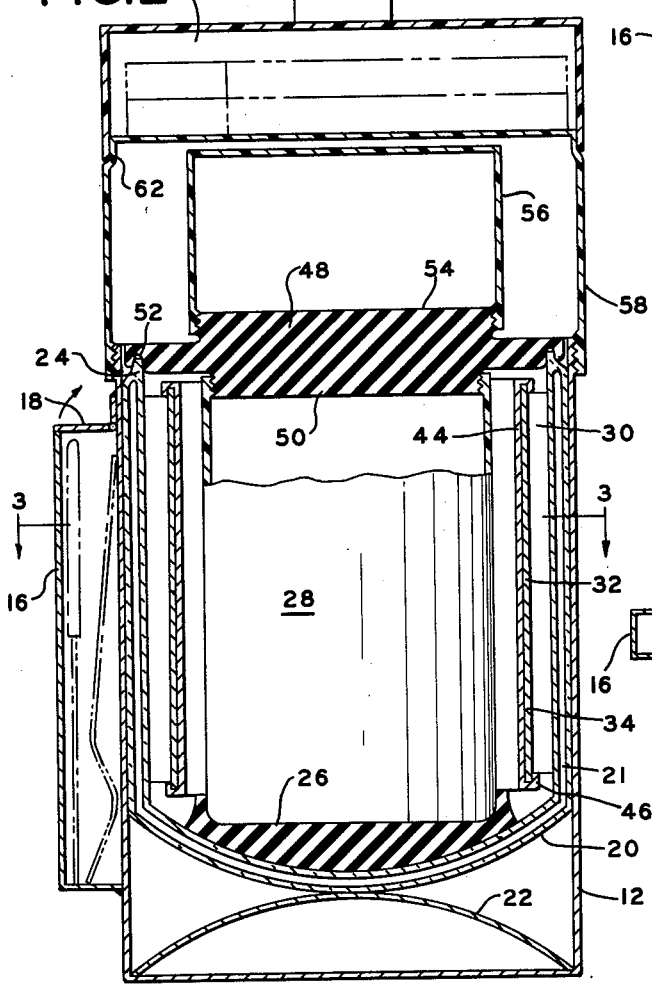
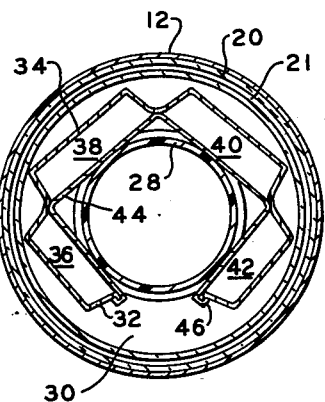
INVENTOR.
ARTHUR D. HERTZOG
BY
*Arthur H. Seidel*
ATTORNEY United States Patent Office 3,127,984
Patented Apr. 7, 1964

3,127,984
LUNCH KIT
Arthur D. Hertzog, 116 N. 11th St., Allentown, Pa.
Filed June 7, 1961, Ser. No. 115,375
5 Claims. (Cl. 206—4)

This invention relates to a lunch kit, and more particularly to a lunch kit which includes means for retaining liquid and solid food within a double-wall insulation unit.

A wide variety of lunch kits have been proposed heretofore. None of the lunch kits proposed heretofore provide means for carrying a liquid and a solid within a double-walled insulation unit capable of maintaining the liquid and the solid at their elevated temperature for a period of several hours.

The lunch kit of the present invention enables a person to partake of hot liquids as well as a plurality of different hot solid foods. The plurality of hot solid foods are disposed within a compartmented container capable of being folded so as to be readily disposed within an annular space. In order to have a compartmented container capable of being disposed within an annular space, I have provided a novel container which is comprised of only two separate elements, namely a top and bottom wall.

It is an object of the present invention to provide a novel lunch kit.

It is another object of the present invention to provide a novel lunch kit which is portable and more compact than lunch kits proposed heretofore while providing means for retaining a liquid and a solid food in a warm state.

It is still another object of this invention to provide a novel lunch kit wherein a novel compartmented container is disposed within an annular space.

It is a still further object of the present invention to provide a novel compartmented food container capable of receiving different solid foods within the compartments, while making said container out of only two elements.

It is still another object of the present invention to provide a novel lunch kit wherein means are provided for maintaining liquids and solids in a warm state, means are provided for enclosing other foods such as bread, and means are provided for carrying utensils, such as forks, knives, and/or spoons.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a perspective view of the lunch kit of the present invention.

FIGURE 2 is a longitudinal sectional view of the lunch kit of the present invention taken along lines 2—2 of FIGURE 1.

FIGURE 3 is a transverse sectional view taken along lines 3—3 of FIGURE 2.

FIGURE 4 is a partial perspective view of a container for solid food without the top wall.

Referring to the drawing in detail, wherein like numerals indicate like elements, there is shown in FIGURE 1 a perspective view of a lunch kit designated generally as 10. The lunch kit 10 comprises an outer cylindrical housing 12 made from a metallic material and having a U-shaped plastic handle 14. The ends of the handle 14 are pivotably secured to the housing 12. A utensil housing 16 is secured to the outer periphery of the housing 12 and is provided with a pivotable cover 18. The utensil housing 16 is adapted to retain the utensils such as forks, knives, and/or spoons.

As shown more clearly in FIGURE 2, the cylindrical housing 12 is open at one end only and receives therein an insulation unit 20. The insulation unit 20 is a double-walled vacuum enclosing unit. The vacuum space of the unit 20 is designated as 21. The unit 20 is retained within the housing 12 by a flange (not shown) adjacent the open end of the housing 12. The unit 20 is biased toward the flange by a bowed leafspring 22. Accordingly, the unit 20 can move downwardly against the bias of the spring 22.

As shown in FIGURE 2, the unit 20 is U-shaped in longitudinal section and is provided with a lip 24 adjacent the open end thereof. The purpose of the lip 24 will be made clear hereinafter. On the inner surface of the unit 20 adjacent the closed end thereof, there is provided a rubber cushion 26. The cushion 26 may be made from other materials if desired, such as cork, plastic, etc. The cushion 26 is provided with a well within which is disposed the closed end of a cylindrical vial 28. The vial 28 has a longitudinal axis substantially coincident with the longitudinal axis of the unit 20. The outer peripheral surface of the vial 28 is spaced radially inwardly from the inner peripheral surface of the unit 20. Accordingly, an annular space 30 is provided therebetween.

A compartmented food container 32 is disposed within the annular space 30. As shown more clearly in FIGURE 3, the compartmented container 32 is provided with a bottom wall 34. The bottom wall 34 for the container 32 is folded so as to provide a plurality of separate compartments 36, 38, 40 and 42. Each compartment is separated by two thicknesses of the bottom wall 34. The bottom wall 34 is provided with a flange around its entire periphery adjacent the open end of the compartments 36–42 which is overlapped and sealed by a top wall 44. It will be noted that the top wall 44 is in abutting contact with the double-walled portion of the bottom wall 34 intermediate the respective compartments.

The flange around the entire periphery of the bottom wall 34 is provided with a V-shaped notch adjacent the double-walled portions therof. The bottom wall 34 and the top wall 44 are preferably made from a lightweight flexible material capable of withstanding high temperatures such as sheet aluminum. The compartments 36–42 are adapted to contain a variety of solid foods. For example, compartment 40 may contain meat, while compartments 36 and 38 may contain vegetables, and compartment 42 may contain a sauce or the like.

The lip 46 on the outer periphery of the top wall 44 overlaps the flange on the bottom wall 34 and is sealed thereto. Thus, the container 32 is capable of retaining solid foods which may be packaged in a frozen state, heated within an oven, and then disposed within the annular space 30. The insulation unit 20 will assist in maintaining the food within the container 32 in a warm state.

A stopper 48 of a flexible material such as rubber, plastic, etc. is provided within the housing 12. The outer periphery of the stopper 48 is greater than the outer periphery of the unit 20 but less than the inner periphery of the housing 12. The stopper 48 is circular and is provided with a boss 50 on a reduced diameter portion concentric with the stopper 48. The outer periphery of the boss 50 is provided with threads which matingly engage with threads on the inner peripheral surface of the vial 28. The stopper 48 is provided with an annular groove 52 spaced radially inwardly from the outer periphery of the stopper 48. The groove 52 receives the lip 24 on the unit 20 with a friction fit therebetween.

The stopper 48 is provided with a boss 54 on a surface opposite from the boss 50. The outer periphery of the boss 54 is provided with threads which matingly engage with threads on the inner peripheral surface of a cup 56. Threads are provided on the outer peripheral surface of the housing 12 adjacent the open end thereof for mating engagement with threads on the inner peripheral surface of a cap 58. As shown more clearly in FIGURE 2, the cap 58 includes a cap extension 60. The cap extension 60 is provided with an outer peripheral surface which corresponds with the outer peripheral surface of the cap 58. The cap 58 is provided with a reduced diameter portion 62 adjacent the closed end thereof around which the open end of the cap extension 60 is disposed. The open end of the cap extension 60 has a friction fit with the reduced diameter portion 62. The cap extension 60 cooperates with the closed end of the cap 58 so as to define a chamber 64 for receiving bread or the like.

The lunch kit 10 of the present invention is utilized as follows:

Assuming that the container 32 is provided with solid foods within the various compartments 36–42, the entire cotnainer 32 is disposed within an oven so as to heat the food disposed therein. When the food within the compartments 36–42 have been cooked, the container 32 is disposed within the unit 20 as shown in FIGURES 2 and 3. It will be noted that the container 32 rests on an annular surface surrounding the well on the cushion 26. The vial 28 will be filled with a hot liquid and disposed within the enclosure formed by the container 32. Prior to the insertion of the vial 28, the threads on the boss 50 of the stopper 48 will be matingly engaged with the threads on the inner peripheral surface of the open end of the vial 28. Thereafter, the peripheral portion of the stopper 48 will be pressed so that the lip 24 on the unit 20 is received within the groove 52 so as to be coupled to the stopper 48.

Thereafter, the cup 56 may be threadably engaged with the boss 54 and the cap 58 may be threadably engaged with the threads adjacent the open end of the housing 12. Thereafter, bread or the like may be disposed on the closed end of the cap 58 and retained in confinement by the cap extension 60. Then, the handle 14 may be pivoted to the disposition shown in FIGURE 1 and the lunch kit 10 may then be carried to the location at which the food and liquid are to be consumed. Such location may be the place of work of the person carrying the same, a picnic, etc.

In the above description, the vial 28 and the container 32 are described as containing hot food or liquids. It will of course be obvious to those skilled in the art that the liquid within the vial 28 and the food within the container 32 may be cold and that the insulation unit 20 will retain the same in its cold state.

Until the food within the lunch kit 10 of the present invention is to be consumed, it will be noted that the threaded engagement between the vial 28 and the boss 50 prevents spilling or loss by evaporation of the liquid disposed within said vial. Further, it will be noted that the friction fit between the stopper 48 and the lip 24 on the insulation unit 20 provides a confined space isolated from the atmosphere. In this manner, the insulation unit 20 is capable of maintaining the food within the container 32 in its original temperature state for a much longer period of time.

The spring 22 and the cushion 26 provide a resilient mounting for the vial 28, container 32, and insulation unit 20. This resilient mounting is added protection against damage or breakage due to jarring. While the vial 28 has been described as being a plastic material, it will be appreciated that the same may be made from glass if desired. It will be obvious to those skilled in the art that the utensils adapted to be disposed within the housing 16 are to be utilized in the consumption of the food within the container 32. Also, it will be obvious that the cup 56 will be utilized during the drinking of the liquid within the vial 28. While the liquid may be consumed directly from the vial 28, the same is generally not considered sanitary and the capacity of the vial 28 makes consumption directly therefrom impractical.

The present invention may be embodied in other specific forms without departing from the spirit or essential attributes thereof and, accordingly, reference should be made to the appended claims, rather than to the foregoing specification as indicating the scope of the invention.

I claim:

1. A lunch kit comprising a housing having an open end, a double-walled insulation unit open at one end within said housing, said open ends being adjacent one another, a vial open at one end disposed within said unit, spacing means for spacing said vial radially inwardly from said unit so as to provide an annular space between said vial and said insulation unit, said spacing means including a stopper within said housing extending across said open end of said insulation unit, a seal between a peripheral portion of said stopper and said open ends of said insulation unit, a central portion of said stopper being coupled and sealed to said vial for simultaneous removal of said stopper and vial from said housing, and a cap secured across the open end of said housing enveloping said stopper.

2. A lunch kit in accordance with claim 1 including a cup, said cup being coupled to said stopper, and said cup being disposed within said cap.

3. A lunch kit in accordance with claim 1 wherein said means providing a seal between said stopper and said insulation unit includes an annular groove on said stopper, a lip on said insulation unit adjacent the open end thereof, and said lip being received within said groove with a friction fit.

4. A lunch kit in accordance with claim 1 including a deformable cushion disposed within said insulation unit, said cushion having a well, and the end of said vial remote from said stopper being received within said well.

5. A lunch kit in accordance with claim 1 including a compartmented package for receiving solid food therein within said annular space, said package having a bottom wall folded so as to provide a plurality of discrete compartments, a top wall of said package sealed to the periphery of said discrete compartments, said package being capable of bending at points between adjacent compartments so as to be capable of being disposed within said annular space.

References Cited in the file of this patent

UNITED STATES PATENTS

| | | |
|---|---|---|
| 1,112,037 | Taylor | Sept. 29, 1914 |
| 2,010,812 | Devine | Aug. 13, 1935 |
| 2,138,241 | Kock | Nov. 29, 1938 |
| 2,462,816 | Schner | Feb. 22, 1949 |
| 2,536,426 | Oliveira | Jan. 2, 1951 |
| 2,630,233 | Kircher | Mar. 3, 1953 |
| 2,917,216 | Despres | Dec. 15, 1959 |
| 2,975,931 | Harrison | Mar. 21, 1961 |